United States Patent [19]

Byles

[11] Patent Number: 5,759,383
[45] Date of Patent: Jun. 2, 1998

[54] ROOT INTRUSION AND ALGAE PREVENTION DEVICE AND METHOD

[75] Inventor: Joe E. Byles, Fresno, Calif.

[73] Assignee: NIBCO, Inc., Elkhart, Ind.

[21] Appl. No.: 702,268

[22] Filed: Aug. 23, 1996

Related U.S. Application Data

[60] Provisional application No. 60/002,696 Aug. 23, 1995.
[51] Int. Cl.$^6$ .................................................. C02F 1/46
[52] U.S. Cl. .................... 205/688; 205/701; 205/742; 204/271; 204/275
[58] Field of Search .................... 205/688, 701, 205/742; 204/275, 271

[56] References Cited

U.S. PATENT DOCUMENTS

| | | | |
|---|---|---|---|
| 3,241,512 | 3/1966 | Green | 204/196 |
| 3,935,670 | 2/1976 | Pluenneke et al. | 47/1.3 |
| 3,975,256 | 8/1976 | Johnson et al. | 204/275 |
| 5,281,312 | 1/1994 | Woodside | 205/701 |

*Primary Examiner*—Arun S. Phasge
*Attorney, Agent, or Firm*—Shaffer & Culbertson; Russell D. Culbertson

[57] ABSTRACT

The apparatus includes a housing (10) defining a housing cavity (18) and at least one connector (15) for connecting the housing to an irrigation conduit (26) so that the housing cavity (18) is exposed to irrigation water flowing through the irrigation conduit (26). A first electrode (13) is positioned within the housing cavity (18) and is made from a growth inhibiting metal. A second electrode (14) is electrically isolated from the first electrode (13) and includes a surface exposed within the housing cavity (18) in a spaced apart relationship with respect to the first electrode (13). A voltage source (30) is connected to the first electrode (13) and to the second electrode (14) for applying an electric potential across the first and second electrodes. When the housing cavity (18) is filled with irrigation water passing through the irrigation conduit (26), the voltage source (30) applied to the first and second electrodes (13, 14) causes an electric current to flow between the electrodes, releasing ions of the growth inhibiting metal into the irrigation water. The method of the invention includes exposing both the first electrode (13) made of a growth inhibiting metal and the second electrode (14) which may or may not be made of a growth inhibiting metal to irrigation water flowing through an irrigation conduit (26). Once the electrodes are exposed to the irrigation water, the method includes applying an electrical potential across the electrodes to induce a current flow between the electrodes (13, 14) and release ions of the growth inhibiting metal into the irrigation water.

12 Claims, 3 Drawing Sheets

ROOT INTRUSION AND ALGAE PREVENTION DEVICE AND METHOD

BACKGROUND OF THE INVENTION

This application claims the benefit of United States provisional application Ser. No. 60/002,696, filed Aug. 23, 1995, which is incorporated herein by reference.

This invention relates to devices and methods for preventing root intrusion in buried irrigation emitters and for preventing algae build-up in irrigation emitters, pipes, conduits, and delivery systems. More particularly, this invention relates to an apparatus and method for providing the efficient, easy, safe dispersal of biological growth inhibiting metal ions into irrigation water prevent root intrusion and algae build-up.

Irrigation systems can be broken into three categories: spray irrigation systems, surface drip irrigation systems, and subsurface drip irrigation systems. Spray systems and surface drip irrigation systems often suffer from algae formation which significantly degrades the performance of water emission devices and water carrying conduits used in such systems. The algae build-up leads to wasted water resources and improperly watered landscape and agricultural plantings. In addition, the algae build-up causes premature failure and maintenance requirements for other system components, such as diaphragm solenoid valves, filters, shut-off valves, etc. To combat algae build-up harmful chemicals such as chlorine gas and water soluble copper compounds are commonly injected into the irrigation water. Accessible components of such irrigations systems are also frequently disassembled and cleaned to remove algae build-up.

Subsurface irrigation lines where the emission devices located below the soil surface also suffer from algae build-up. Subsurface emission devices additionally suffer from root growth around the emission device and root intrusion into the device itself. Roots surrounding a subsurface emission device reduces flow from the device, whereas root intrusion can plug the device entirely. In either case, the root growth leads to improper water distribution around the emission device.

Root intrusion in and around subsurface irrigation emission devices has been controlled by injections of non-systemic herbicides or strong acid based chemicals into the irrigation water to burn out the intruding root systems. Both of these methods involve the handling of potentially harmful chemicals and require frequent treatments since the chemicals break down over time. Herbicides have also been impregnated into the plastic from which subsurface emission devices are formed. This herbicide releases slowly from the device to inhibit root growth around the device. This herbicide impregnation technique, however, still requires dangerous chemical herbicides. Furthermore, the amount of herbicide which may be impregnated in the plastic is limited and such products have a useful life dependent upon many factors including installation, storage time, temperature, and water utilization. Once the impregnated chemical herbicide is depleted in the plastic, the system is again subject to root intrusion. In addition, installers of the product are subjected to the chemical herbicide and any harmful effects it might have.

SUMMARY OF INVENTION

It is therefore a general object of the invention to overcome the above-described problems and others associated with irrigation systems. More particularly, it is an object of the invention to provide devices and methods for preventing algae build-up in surface and subsurface irrigation systems, and root intrusion in subsurface irrigation systems.

In order to accomplish this object, the apparatus according to the invention includes a first electrode comprised of copper and/or other metallic components such as silver, or an alloy of copper and other metals, contained in the cavity of a housing. A second electrode, also preferably made of copper or other suitable metal, is positioned in the housing in a spaced apart relationship to the first electrode. Attached to the first and second electrodes are electrical leads which exit the housing through a suitable sealing structure so that the housing is water tight when the cavity thereof is exposed to high pressure water. The electrical leads are connected to a voltage source to apply a voltage across the electrodes. When the cavity of the housing is filled with water, the potential across the electrodes induces a current flow which causes metal ions to release from the electrodes into the water.

The preferred housing has a top section with connections allowing the housing to be installed into a conventional irrigation conduit via threaded pipe fittings or solvent welding. A bottom section of the housing may be disconnected from the top section to provide access to the electrodes for replacement as necessary. The housing is designed to allow water travelling through the irrigation conduit to pass over the first electrode where copper and/or other metallic ions will be introduced into the water source for dispersal. The chamber housing can be manufactured from an injection molded plastic such as polyethylene, ABS, or any suitable, rigid plastic material. The housing can also be made out of a cast or machined metal, but the electrodes must be electrically isolated from the housing to prevent electrical current leakage.

In the preferred form of the invention, the housing containing the electrodes is installed in an irrigation conduit in close proximity to an electric solenoid operated valve device. The leads from the electrodes are spliced into the leads from the solenoid operated valve, placing the ionic device in a parallel configuration to the valve. This parallel connection allows the voltage source (approx. 24 Volts AC) from the irrigation controller device which activates the solenoid operated valve to apply an electrical potential across the electrodes in the housing cavity, releasing copper and/or other metal ions into the irrigation water as it flows through the open valve and housing cavity.

The voltage potential across the electrodes can be regulated by placing a variable resistor or potentiometer in series with the loop including the electrodes. This resistor will allow a percentage of the voltage to be dropped across the resistor and proportionally reduce the voltage across electrodes. This allows control over the amount of copper and/or other metal ions released, since the voltage across the electrodes is directly proportional to the amount of metal ions released.

When the irrigation cycle is over, the alternating voltage source from the irrigation controller is turned off, eliminating the voltage across the electrodes and stopping the release of the metal ions into the irrigation water. The system, therefore, only releases metal ions into the irrigation water when the irrigation controller opens the solenoid operated valve, allowing water to flow through the system. The device can be placed with each valve (typical of a landscape installation) or a large device or devices can be placed the main water source and activated with the pump system typical of a larger agricultural installation.

With copper electrodes, the device described above releases up to 1 part per million of copper into the irrigation water flowing through the conduit, every time the system is turned on. The copper travels in the irrigation water, acting as a toxin to algae which is contained in the water. Any copper which is not consumed in killing algae, is emitted through the emission device or devices of the irrigation system. If it is a spray irrigation system, the small amount of copper is distributed over a very large area and has no effect on the vegetation irrigated with the water. The only effect will be the prevention of algae build-up within the system. For surface and subsurface drip systems, the water is released into the soil, which acts like a filter and binds up the copper in the soil directly surrounding the emitter. Over time, this creates a layer of copper laden soil, which is toxic to plant roots. Roots cannot grow into this copper rich soil and thus the soil forms a barrier protecting the emitters from root intrusion. This effect is in addition to the prevention of algae build-up in the irrigation conduits.

Significant research has been accomplished showing the effects of copper killing algae and stopping the growth of roots in a localized environment. However, there has been no easy, effective way of introducing copper into irrigation water. The apparatus and method of the invention, which preferably utilizes existing power available from low voltage controllers already in place in irrigation systems, provides a cost effective solution to directly injecting chemicals.

These and other objects, advantages and features of the invention will be apparent from the following description of the preferred embodiments, considered along with the accompanying drawings.

DESCRIPTION OF THE PREFERRED EMBODIMENT

Figure 1:
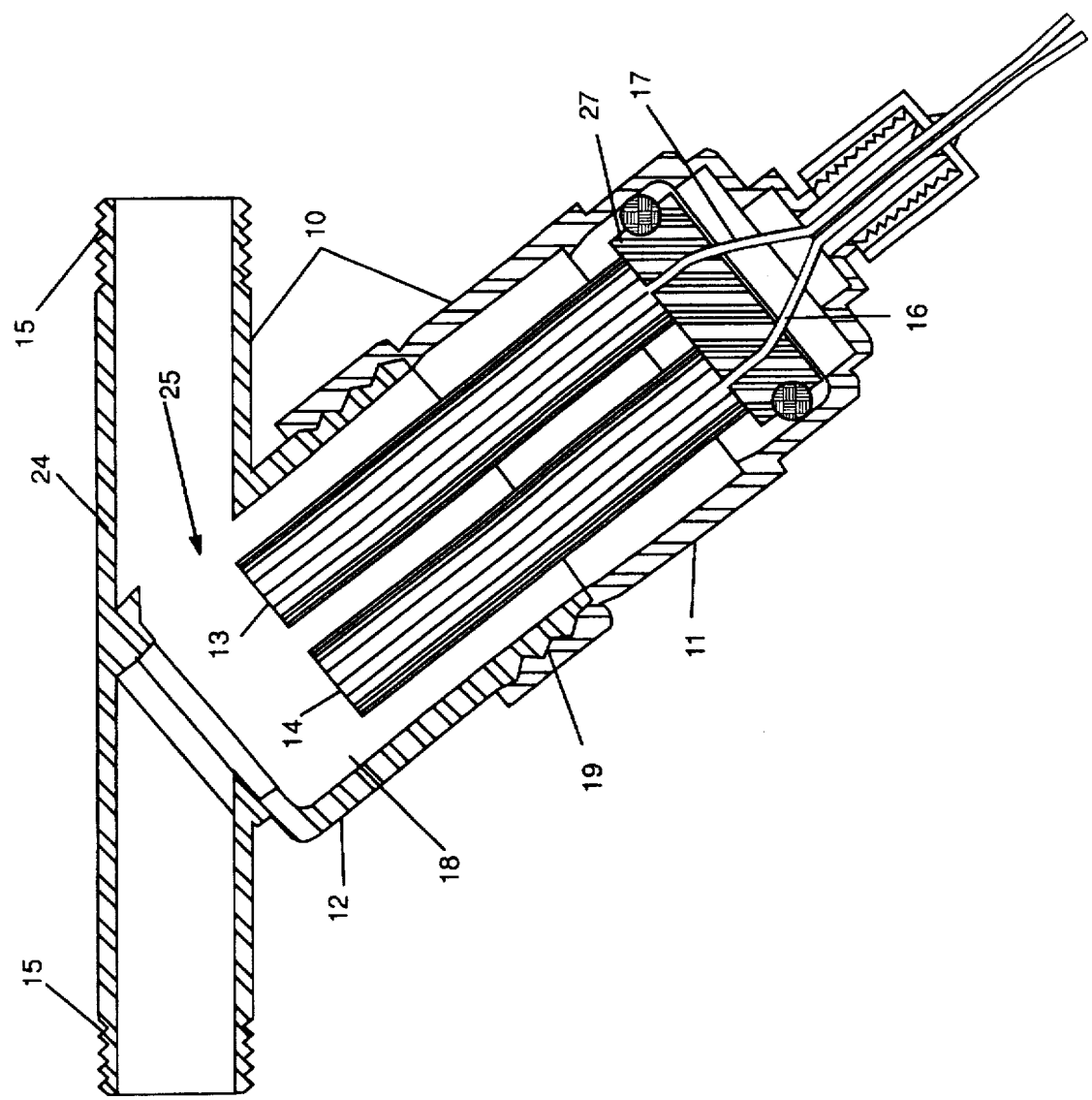
FIG. 1 is a somewhat schematic view, partially in longitudinal section of a device embodying the principles of the invention.

Referring to FIG. 1, an apparatus embodying the principles of the invention includes a housing 10 which defines a cavity 18. The preferred housing 10 includes a lower section 11 and an upper section 12. The two sections 11 and 12 are connected together by threaded connection 19. A first electrode 13 and a second electrode 14 are contained within the cavity 18 defined by the housing 10. The electrodes 13 and 14 are preferably each mounted on an insulating base 27 mounted within the housing cavity 18. Containing the first electrode 13 and second electrode 14 in the lower housing section 11 allows the electrodes to be replaced without removing the upper housing section 12 from the irrigation conduit to which the housing 10 may be connected.

The electrodes 13 and 14 are preferably each made of a metal or metal alloy which, in minute quantities, is toxic to algae and plants. Such metals or metal alloys shall be referred to herein as growth inhibiting metals and include copper and silver. Both copper and silver are known to be toxic agents to plants and to bacteria and algae contained in water.

The preferred housing 10 illustrated in FIG. 1 includes a length of conduit 24 having an opening 25 which is open to the housing cavity 18. The length of conduit 24 has connectors 15 at each end for attaching the housing to an irrigation conduit pipe and to an electric solenoid control valve in close proximity. The connectors 15 can be threaded fittings or slip fittings used for solvent welding plastic plumbing fittings together.

Figure 2:
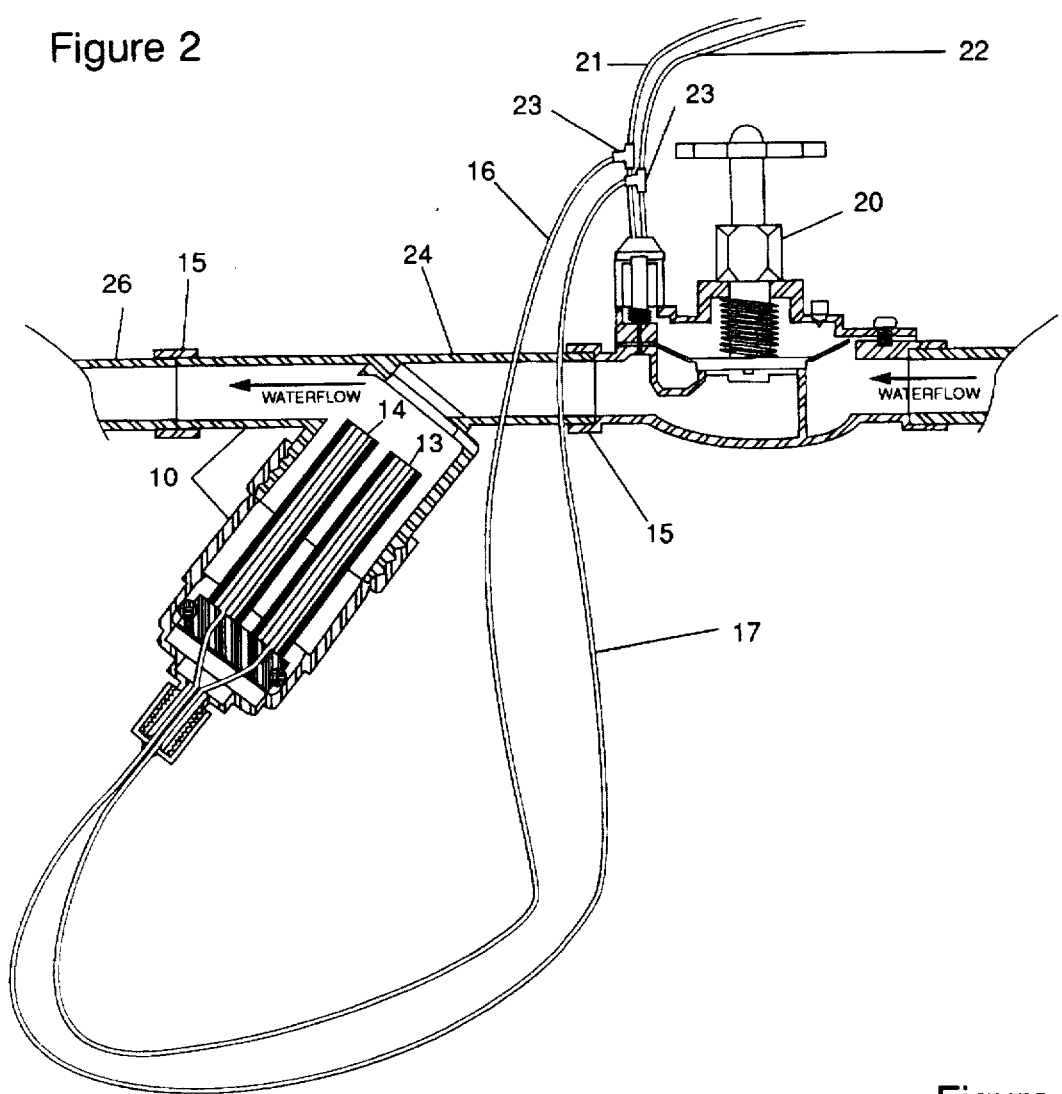
FIG. 2 is a somewhat schematic view, partially in longitudinal section showing the device shown in FIG. 1 installed in an irrigation conduit.

Referring now to FIGS. 1 and 2, the housing 10 is connected to an irrigation conduit 26 and a solenoid operated valve 20. A first lead wire 16 is connected to the first electrode 13 and a second lead wire 17 is connected to the second electrode 14. The lead wires 16 and 17 exit the housing 10 through a suitable seal arrangement and are attached in parallel with waterproof connectors 23 to leads 21 and 22, respectively, of the solenoid operated valve 20. When the control voltage, commonly twenty-four (24) volts AC, is applied to the valve 20, the valve opens allowing water to flow from right to left in FIG. 2 through the solenoid operated valve and over the electrodes 13 and 14. This same voltage applied through leads 16 and 17 across electrodes 13 and 14 induces the electrolytic release of growth inhibiting metal ions into the water. When the control voltage signal is cut off, the valve 20 closes and the electrolytic release of metal ions into the water in the housing cavity 18.

Figure 3:
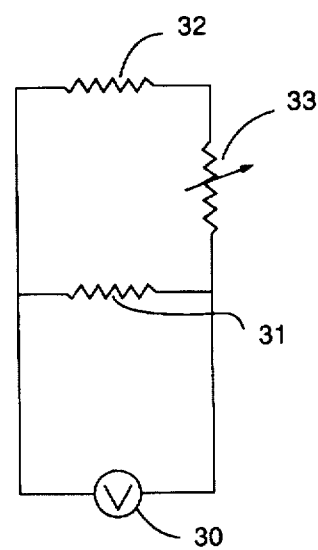
FIG. 3 is an electrical schematic diagram of the device shown in FIG. 2

FIG. 3 shows the electrical connection of the preferred embodiment of the invention to the valve and the irrigation controller timer. The irrigation controller timer 30 provides a potential voltage of 24 volts AC to cause the solenoid represented by resistance 31 to open the valve (20 in FIG. 2). The resistance associated with the current flow between electrodes 13 and 14 in FIG. 2 is represented by resistance 32 in FIG. 3. The combined resistance 31 of the valve and resistance 32 across electrodes 13 and 14 represents a resistive load to the voltage supplied through the timer 30. FIG. 3 also shows a variable resistance potentiometer 33 included in the circuit to provide control over the voltage across the electrodes 13 and 14 only, with no effect on the voltage across the valve 31.

Figure 4:
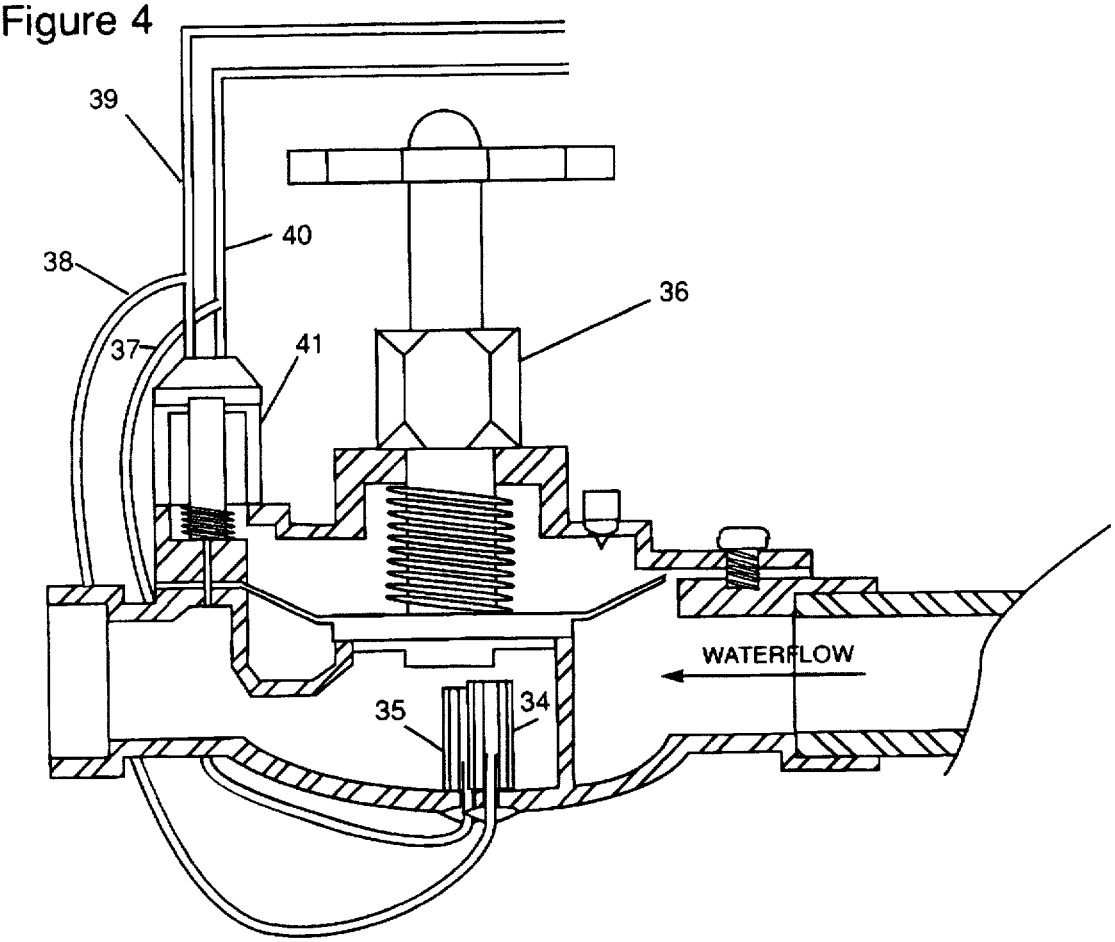
FIG. 4 is a somewhat schematic view, partially in longitudinal section showing an alternate form of the invention.

FIG. 4 shows an alternate form of the invention with a first electrode 34 and second electrode 35 mounted in a cavity associated with an electric solenoid operated control valve 36. In this form of the invention, the lead wires 37 and 38 from the first and second electrodes 34 and 35, respectively, are pre-attached to the lead wires 39 and 40 from the solenoid 41 within the valve 36. In operation, the integrally formed valve 36 is installed as a normally functioning solenoid operated control valve. As the current passes through the first and second electrodes 34 and 35 when voltage is applied to leads 39 and 40 to open valve 36, metal ions are released into the irrigation water stream flowing through the open valve.

Figure 5:
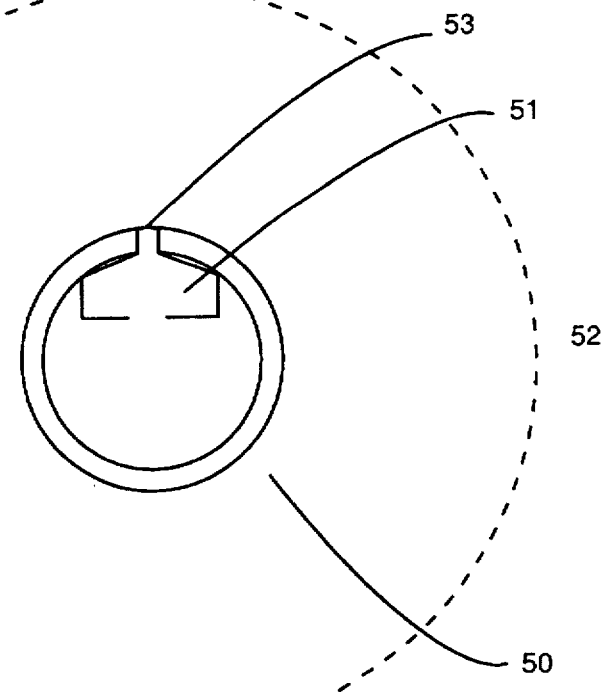
FIG. 5 is a schematic diagram showing the sphere of copper concentration around a drip emitter device located below the soil.

FIG. 5 is a schematic view of the area of copper concentration 50 around a drip emitter 51 buried in a soil 52. The copper sphere 50 binds to the soil 52 in a typically spheroid pattern around the emission opening 53 of the drip emitter 51. The copper laden soil represented as sphere 50 acts as a barrier to inhibit root growth into the emission opening 53.

The above described preferred embodiments are intended to illustrate the principles of the invention, but not to limit the scope of the invention. Various other embodiments and modifications to these preferred embodiments may be made by those skilled in the art without departing from the scope of the invention as described. For example, although the embodiments discussed above includes an alternating current applied across two growth inhibiting metal electrodes, direct current may be applied between a single growth inhibiting metal electrode and another electrode exposed within the device housing. Also, the device according to the invention need not be associated with a solenoid operated valve, but may be operated by an independent voltage signal.

I claim:

1. An apparatus for inhibiting root growth into subsurface irrigation emitters, the apparatus comprising:

(a) a housing defining a housing cavity;

(b) an irrigation conduit connected to a subsurface portion, the subsurface portion having at least one subsurface irrigation water emitter;

(c) at least one connector associated with the housing for connecting the housing to the irrigation conduit so that the housing cavity is exposed to water that may flow through the irrigation conduit;

(d) a first electrode positioned within the housing cavity and being made from a growth inhibiting metal;

(e) a second electrode having a surface exposed within the housing cavity and being electrically isolated from the first electrode; and (f) a voltage source connected to the first electrode and to the second electrode for applying an electric potential across the first electrode and second electrode so that when the housing cavity is filled with water, an electric current flows between the first electrode and the second electrode releasing ions of the growth inhibiting metal into the water within the housing cavity.

2. The apparatus of claim 1 further comprising:

(a) a potentiometer associated with the voltage source for varying the voltage applied across the first electrode and second electrode.

3. The apparatus of claim 1 wherein the first electrode is made of copper.

4. The apparatus of claim 1 wherein the first electrode and second electrode each comprise a different rod of copper extending into the housing cavity.

5. The apparatus of claim 1 wherein the first electrode and second electrode are each mounted in a spaced apart relation on an insulating base which is removably mounted within the housing cavity.

6. The apparatus of claim 5 further comprising:

(a) a lead sealing structure associated with the housing;

(b) a first electrical lead connected to the first electrode and extending through the insulating base and the lead sealing structure; and (c) a second lead connected to the second electrode and extending through the insulating base and the lead sealing structure associated with the housing.

7. The apparatus of claim 1 further comprising a solenoid operated valve for controlling the flow of irrigation water through the irrigation conduit and wherein the voltage source includes:

(a) a first lead connecting the first electrode to a first lead of the solenoid operated valve; and (b) a second lead connecting the second electrode to a second lead of the solenoid operated valve.

8. The apparatus of claim 1 wherein the housing includes:

(a) an upper housing section;

(b) a lower housing section; and (c) a housing connector associated with the upper housing section and lower housing section for connecting the upper and lower housing section together to define the housing cavity.

9. The apparatus of claim 1 further comprising:

(a) a length of conduit connected to the housing and having an opening leading to the housing cavity; and (b) wherein the length of conduit includes a first irrigation line connector associated with a first end of the conduit and a second irrigation line connector associated with a second end of the conduit.

10. A method of inhibiting root growth into subsurface irrigation emitters, the method comprising the steps of:

(a) directing a flow of irrigation water through an irrigation conduit connected to a subsurface conduit portion containing at least one subsurface irrigation water emitter;

(b) exposing the irrigation water flowing into the irrigation conduit to a first electrode made of a growth inhibiting metal;

(c) exposing the irrigation water flowing into the irrigation conduit to a second electrode in a spaced apart position from the first electrode; and (d) applying an electrical potential across the first electrode and second electrode to induce a current flow from the first electrode to the second electrode, such current flow releasing ions of the growth inhibiting metal into the irrigation water.

11. The method of claim 10 wherein the first electrode is connected to a first lead of a solenoid operated valve used to control the flow of irrigation water through the irrigation conduit, the second electrode is connected to a second lead of the solenoid operated valve, and the step of applying the electrical potential across the first electrode and second electrode comprises:

(a) applying an electrical potential across the leads of the solenoid operated valve to open the valve and allow irrigation water to flow past the first and second electrodes through the irrigation conduit.

12. The method of claim 10 wherein both the first electrode and second electrode are made of a growth inhibiting metal and the step of applying the electric potential across the first and second electrodes comprises applying an alternating current voltage source across the electrodes.

* * * * *